US005679005A

United States Patent [19]
Einstein

[11] Patent Number: 5,679,005
[45] Date of Patent: Oct. 21, 1997

[54] MODEL OF CORRECTED TRANSPOSITION OF THE GREAT ARTERIES

[76] Inventor: Peter Einstein, 1741 Murray Hill Rd., Birmingham, Ala. 35216

[21] Appl. No.: 428,402

[22] Filed: Apr. 24, 1995

[51] Int. Cl.$^6$ .................................................. G09B 23/28
[52] U.S. Cl. ........................... 434/268; 434/267; 434/272
[58] Field of Search ................................... 434/272, 268, 434/267, 262

[56] References Cited

PUBLICATIONS

Ebels, T., "Coronary compression after arterial switch procedure", J. Thorac Cardiovasc Surg 107:632 1994.
Senning, Ake, "Surgical correction of transposition of the great vessels", Surgery 59:334–336 (1966).
Mustard, W.T., "Successful two–stage correction of transposition of the great vessels", Surgery 55:469–472 (1964).
Bailey, L.L., et al., "Mustard operation in the 1st month of life", Am J Cardiol 49:766–770 (1982).
Marx, G. R., et al., "Transposition of the great arteries with intact ventricular septum: Results of Mustard and Senning operations in 123 consecutive patients", J Am Coll Cardiol 1:476–483 (1983).
Williams, W. G., et al., "Early and late results of a protocol for simple transposition leading to an atrial switch (Mustard) repair", J Thorac Cardiovasc Surg 95:717–726 (1988).
Bender, H.W., Jr., et al., "Ten years' experience with the Senning operation for transposition of the great arteries: Physiological results and late follow–up", Ann Thorac Surg 47:218–223 (1989).
Backer, C. L., et al., "Transposition of the great arteries: A comparison of results of the Mustard procedure versus the arterial switch", Ann Thorac Surg 48:10–14 (1989).
Helbing, W. A., et al., "Long–term results of atrial correction for transposition of the great arteries: Comparison of Mustard & Senning operations", J Thorac Cardiovasc Surg 108:363–372 (1994).

Hurwitz, R., et al., "Right ventricular function in adolescents and young adults after previous Mustard operation", J Am Coll Cardiol, Abstract No. 702–2, p. 37A (Feb. 1995).
Connelly, M.S., et al., "Functional capacity in adult patients with Mustard correction", J Am Coll Cardiol, Abstract No. 794–6, p. 378A (Feb. 1995).
Flinn, C. J., et al., "Cardiac rhythm after the Mustard operation for complete transposition of the great arteries", N Eng J Med 310:1635–1638 (1984).

(List continued on next page.)

Primary Examiner—Jeffrey A. Smith
Attorney, Agent, or Firm—Needle & Rosenberg, PC

[57] ABSTRACT

This invention relates to the creation of an animal model which has the circulatory physiology of the fatal human infant condition of transposition of the great arteries (TGA) by surgically altering the normal animal heart, and the surgical correction of this fatal physiology by simultaneously altering the normal animal vasculature. The result of performing these two procedures simultaneously in a normal animal is that the heart chamber that normally pumps deoxygenated blood to the lungs (right ventricle) is switched to pump oxygenated blood to the body, and the chamber that normally pumps oxygenated blood to the body (left ventricle) is switched to pump deoxygenated blood to the lungs. Such unusual circulatory connections are present in humans who have the condition known as congenitally corrected transposition of the great arteries (corrected TGA).

The model is useful for surgical training, the design of safer TGA corrections, the development of operations to interchange the pulmonary for the failing systemic ventricle, and makes it possible to thoroughly study the important clinical, extracellular, cellular and intracellular consequences of switching the pulmonary and systemic pumping roles of morphologic right and left ventricles.

6 Claims, 1 Drawing Sheet

OTHER PUBLICATIONS

Gillette, P. C., et al., "Mechanisms of cardiac arrhythmias after the Mustard operation for transposition of the great arteries", Am J Cardiol 45:1225–1230 (1980).

Hesslein, P.S., et al., "Exercise assessment of sinoatrial node function following the Mustard operation", Am Heart J 103:351–357 (1982).

Gelatt, M., et al., "Factors associated with arrhythmias after Mustard operation—30 year experience with 534 patients", J Am Coll Cardiol, Abstract No. 702–3, p. 37A (Feb. 1995).

Jatene, A.D., et al., "Anatomtc correction of transposition of the great vessels", J Thorac Cardiovasc Surg 72:364–370 (1976).

Quaegebeur, J.M., et al., "The arterial switch operation: An eight–year experience", J Thorac Cardiovasc Surg 92:361–384 (1986).

Brutel de la Riviere, A. et al., "Growth of an aorta–coronary anastomosis: An experimental study in pigs", J Thorac Cardiovasc Surg 86:393–399 (1983).

Kirklin, J.W. and Barrett–Boyes, B.F., "Chapter 39: Complete Transposition of the Great Arteries" Cardiac Surgery (2nd Ed.), New York; Churchill Livingstone, pp. 1383–1467 (1993).

Brawn, W. J., et al., "Early results for anatomtc correction of transposition of the great arteries and for double–outlet right ventricle with subpulmonary ventricular septal defect" J Thorac Cardiovasc Surg 95:230–238 (1988).

Tam, S., et al., "Transposition of the great arteries with posterior aorta: Anatomic repair", J Thorac Cardiovasc Surg 100:441–444 (1990).

Wernovsky, G. et al., "Factors influencing early and late outcome of the arterial switch operation for transposition of the great arteries", J Thorac Cardiovasc Surg 109:289–302 (1995).

Yacoub, M. H. and Radley–Smith, R., "Anatomy of the coronary arteries in transposition of the great arteries and methods for their transfer in anatomical correction", Thorax 33:418–424 (1978).

Planché, C. et al., "Switch operation for transposition of the great arteries in neonates: A study of 120 patients", J Thorac Cardiovasc Surg 96:354–363 (1988).

Moat, N.E., et al., "Complex coronary arterial anatomy in transposition of the great arteries: Arterial switch procedure without coronary relocation", J Thorac Cardiovasc Surg 103:872–876 (1992).

Day, R. W., et al., "The influence of coronary anatomy on the arterial switch operation in neonates", J Thorac Cardiovasc Surg 104:706–712 (1992).

Vouhé, P.R. et al., "Arterial switch operation: A new technique of coronary transfer", Eur J Cardio–Thorac Surg 8:74–78 (1994).

Asou, T. et al., "Arterial Switch: Translocation of the intramural coronary artery", Ann Thorac Surg 57:461–465 (1994).

Serraf, A., et al., "Anatomic correction of transposition of the great arteries in neonates", J Am Coll Cardiol 22:193–200 (1993).

Aubert, J., et al., "Transposition of the great arteries: New technique for anatomical correction", British Heart Journal 40:204–208 (1978).

Krishnan, P. et al., "Complete transposition of the great arteries with aortopulmonary window: Surgical treatment and embryologic significance", J Thorac Cardiovasc Surg 101:749–751 (1991).

Amato, J. J., et al., "Complete transposition of the great arteries with aortopulmonary window", J Thorac and Cardiovasc Surg 104:1490 (1992).

Danford, D.A., et al., "Left ventricular wall stress and thickness in complete transposition of the great arteries: Implications for surgical intervention", J Thorac Cardiovasc Surg 89:610–615 (1985).

Ilbawi, M.N., et al., "Preparation of the left ventricle for anatomical correction in patients with simple transposition of the great arteries: Surgical guidelines", J Thorac Cardiovasc Surg 94:87–94 (1987).

Jonas, R.A., et al., "Rapid, two–stage arterial switch for transposition of the great arteries and intact ventricular septum beyond the neonatal period", Circulation 80[Suppl. I]:I–203–I–208 (1989).

Di Donato, R.M., et al., "Age–dependent ventricular response to pressure overload: Considerations for the arterial switch operation", J Thorac Cardiovasc Surg 104:713–722 (1992).

Boutin, C., et al., "Rapid two–stage arterial switch operation: Evaluation of left ventricular systolic mechanics late after an acute pressure overload stimulus in infancy", Circulation 90:1294–1303 (1994).

Boutin, C., et al., "Rapid two stage arterial switch operation: Acquisition of left ventricular mass after pulmonary artery banding in infants with transposition of the great arteries", Circulation 90:1304–1309 (1994).

Mee, R.B.B., "Severe right ventricular failure after Mustard or Senning operation: Two–stage repair: Pulmonary artery banding and switch", J Thorac Cardiovasc Surg 92:385–390 (1986).

Jenkins, K.J., et al., "Function of the anatomic pulmonary valve in the systemic circulation", Circulation 84[Suppl. III]:III–173–III–179 (1991).

Chang, A.C., et al., "Surgical management of late right ventricular failure after Mustard or Senning repair", Circulation 86[Suppl. II]:II–140–II–149 (1992).

Cochrane, A.D., et al., "Staged conversion to arterial switch for late failure of the systemic right ventricle", Ann Thorac Surg 56:854–862 (1993).

Kolvalchin, J.P., et al., "Pulmonary valve eccentricity in d–transposition of the great arteries and implications for the arterial switch operation", Am J Cardiol 73:186–190 (1994).

Colan, S.D., et al., "Status of the left ventricle after arterial switch operation for transposition of the great arteries: Hemodynamic and echocardiographic evaluation", J Thorac Cardiovasc Surg 109:311–321 (1995).

Muraoka, R., et al., "Extrathoracically adjustable pulmonary artery banding", J Thorac Cardiovasc Surg 86:582–586 (1983).

Higgins, C.B., et al.,"Modified technique for production of experimental right–sided congestive heart failure", Cardiovascular Research 7:870–874 (1973).

Aoyagi, T., et al., "Transition from compensated hypertrophy to intrinsic myocardial dysfunction during development of left ventricular pressure–overload hypertrophy in conscious sheep: systolic dysfunction precedes diastolic dysfunction", Circulation 88[Part 1]:2415–2425 (1993).

Higashidate, M., et al., "Percutaneously adjustable pulmonary artery band", J Thorac Cardiovasc Surg 97:864–869 (1989).

Dajee, H., et al., "An improved method of pulmonary artery banding", Ann Thoracic Surg 37:254–257 (1984).

Park, S.C., et al., "A percutaneously adjustable device for banding of the pulmonary trunk", Intl J Cardiol 9:477–484 (1985).

Solis, E., et al., "Percutaneously adjustable pulmonary artery band", Ann Thoracic Surg 41: 65–69 (1986).

Solis, E., et al., "Left ventricular preparation with an extrathoracically adjustable balloon occluder", Ann Thorac Surg 44:58–61 (1987).

Katayama, H., et al., "Induction of right ventricular hypertrophy with obstructing balloon catheter: Nonsurgical ventricular preparation for the arterial switch operation in simple transposition", Circulation 88[part 1]: 1765–1769 (1993).

Wernovsky, G. and Colan, S.D., "Induction of right ventricular hypertrophy with obstructing balloon catheter", Circulation 89:1911–1912 (1994).

Davis, J.O., et al., "Right-sided congestive heart failure in dogs produced by controlled progressive constriction of the pulmonary artery", Circulation Research 3:252–258 (1955).

Shane, R.A., et al., "Adjustable prosthesis for pulmonary artery banding: Comparison with umbilical tape and teflon bands", Circulation 35,36[Suppl. I]:I–148–I–151 (1967).

Bishop, S.P. and Cole, C.R., "Production of externally controlled progressive pulmonic stenosis in the dog", J Appl Physiol 26:659–663 (1969).

Fishman, N.H. and Benson, B.R., "An adjustable pulmonary artery band", Arch Surg 102:143 (1971).

Lange, P.E., et al., "A new device for slow progressive narrowing of vessels", Basic Res Cardiol 80:430–435 (1985).

de Leval, M.R., et al., "Modified Blalock-Taussig shunt: Use of subclavian artery orifice as flow regulator in prosthetic systemic-pulmonary artery shunts", J Thorac Cardiovasc Surg 81:112–119 (1981).

Laks, H., et al., "Partial Fontan: Advantages of an adjustable interatrial communication", Ann Thorac Surg 52:1084–1095 (1991).

Pearl, J.M. and Laks, H., "The Partial Fontan: Controlled temporary systemic venous decompression after the Fontan procedure", Sem Thoracic Cardiovasc Surg 6:21–27 (1994).

Harake, B. et al., "Acute hemodynamic effects of adjustable atrial septal defect closure in the lateral tunnel Fontan procedure", J Am Coll Cardiol 23:1671–1676 (1994).

Brawn, W.J., et al., "Atrial and arterial switch repair for corrected transposition and ventricular septal defect with severe tricuspid valve regurgitation", Cardiology in the Young (Jun.):58 (1993).

Yagihara, T., et al., "Double switch operation in cardiac anomalies with atrioventricular and ventriculoarterial discordance", J Thorac Cardiovasc Surg 107:351–358 (1994).

Yamagishi, M., et al., "Anatomic correction of atrioventricular discordance", J Thorac Cardiovasc Surg 105:1067–1076 (1993).

Imai, Y, , et al., "Ventricular function after anatomic repair in patients with atrioventricular discordance", J Thorac Cardiovasc Surg 107:1272–1283 (1994).

Kirklin, J.W. and Barrett-Boyes, G.B., "Chapter 42: Congenitally Corrected Transposition of the Great Arteries", Cardiac Surgery (2nd Ed.), New York; Churchill Livingstone, pp. 1511–1533 (1993).

Bishop, S.P. and Melsen, L.R., "Myocardial necrosis, fibrosis, and DNA synthesis in experimental cardiac hypertrophy induced by sudden pressure overload", Circulation Research 39:238–245 (1976).

Rakusan, K., et al., "Morphometry of human coronary capillaries during normal growth and the effect of age in left ventricular pressure-overload hypertrophy", Circulation 86:38–46 (1992).

Pardo Mindán, F.J. and Panizo, A., "Alterations in the extracellular matrix of the myocardium in essential hypertension", European Heart J 14(Suppl. J):12–14 (1993).

Izumo, S. et al., "Myosin heavy chain messenger RNA and protein isoform transitions during cardiac hypertrophy", J Clin Invest 79:970–977 (1987).

Izumo, S., et al., "Protooncogene induction and reprogramming of cardiac gene expression produced by pressure overload", Proc Natl Acad Sci USA 85:339–343 (1988).

Takahashi, T. et al., "Age-related differences in the expression of proto-oncogene and contractile protein genes in response to pressure overload in the rat myocardium", J Clin Invest 89:939–946 (1992).

Schwartz, K. et al., "Exclusion of cardiac myosin heavy chain and actin gene involvement in hypertrophic cardiomyopathy of several French families", Circulation Research 71:3–8 (1992).

Nadal-Ginard, B., et al., "Cellular and molecular biology of the cardiovascular system", Circulation Research, 71:1–2 (1992).

Nadal-Ginard B. and Mahdavi, V., "Molecular basis of cardiac performance", J Clin Invest 84:1693–1700 (1989).

Nadal-Ginard B. and Mahdavi V., "Molecular mechanisms of cardiac gene expression", Basic Res Cardiol 88[Suppl. I]:65–79 (1993).

MODEL OF CORRECTED TRANSPOSITION OF THE GREAT ARTERIES

FIELD OF THE INVENTION

This invention relates to the creation of an animal model which has the circulatory physiology of the fatal human infant condition of transposition of the great arteries (TGA) by surgically altering the normal animal heart, and the surgical correction of this fatal physiology by simultaneously altering the normal animal vasculature. The result of performing these two procedures simultaneously in a normal animal is that the heart chamber that normally pumps deoxygenated blood to the lungs (right ventricle) is switched to pump oxygenated blood to the body, and the chamber that normally pumps oxygenated blood to the body (left ventricle) is switched to pump deoxygenated blood to the lungs. Such unusual circulatory connections are present in humans who have the condition known as congenitally corrected transposition of the great arteries (corrected TGA).

The model is useful for surgical training, the design of safer TGA corrections, the development of operations to interchange the pulmonary for the failing systemic ventricle, and makes it possible to thoroughly study the important clinical, extracellular, cellular and intracellular consequences of switching the pulmonary and systemic pumping roles of morphologic right and left ventricles.

BACKGROUND OF THE INVENTION

Babies born with transposition of the great arteries (TGA) nearly all die by one year of age if they do not receive treatment. In this condition, deoxygenated blood returns to the heart from the body and is pumped immediately back to the body without flowing through the lungs to become oxygenated. Oxygenated blood returns to the heart from the lungs and is pumped immediately and futilely back to the lungs. This is because the aorta is connected to the right ventricle (RV) and the pulmonary artery is connected to the left ventricle (LV).

Between 1960 and 1985 surgeons operating to correct TGA usually created a Mustard or Senning-type intra-atrial baffle to divert deoxygenated blood to the pulmonary ventricle and oxygenated blood to the systemic ventricle. See Mustard, W. T., *Successful two-stage correction of transposition of the great vessels*, Surgery 55:469 (1964); Senning, A., *Surgical correction of transposition of the great vessels*, Surgery 59:334 (1966); Bailey, L. L., et al., *Mustard operation in the 1st month of life*, The American Journal of Cardiology 49:766 (1982). These atrial operations have been associated with an unacceptable incidence of arrhythmias, late sudden death, and some failure of the morphologic RV to function as a systemic ventricle. See Marx, G. R., et al., *Transposition of the great arteries with intact ventricular septum: Results of Mustard and Senning operations in 123 consecutive patients*, J. Am. Coll. Cardiol, 2:476 (1983); Williams, W. G., et al., *Early and late results of a protocol for simple transposition leading to an atrial switch (Mustard) repair*, J. Thorac. Cardiovasc. Surg. 95:717 (1988); Bender, H. W., et al., *Ten years' experience with the Senning operation for transposition of the great arteries: Physiological results and late follow-up*, Ann. Thorac. Surg., 47:218 (1989).

Beginning with Jatene in 1975, the arterial switch operation has now nearly replaced the atrial baffle operations. See Jatene, A. D., et al., *Anatomic correction of transposition of the great vessels*, J. Thorac. Cardiovasc. Surg., 72:364 (1976); Quaegebeur, J. M., et al., The arterial switch operation. An eight-year experience, J. Thorac. Cardiovasc. Surg., 92:361 (1986); Kirklin, J. W. and Barratt-Boyes, B. G., *Cardiac Surgery* (2nd Ed.), New York; Churchill Livingstone, p. 1451 (1993). By connecting the morphologic left ventricle to the systemic arteries and the morphologic right ventricle to the pulmonary arteries, it has been hoped that late arrhythmias and failure of the systemic ventricle would be eliminated, and so far this hope has been substantiated. See, Kirklin, J. W. and Barratt-Boyes, B. G., *Cardiac Surgery* (2nd Ed.), New York; Churchill Livingstone, p. 1451 (1993); Backer, C. L., et at., *Transposition of the great arteries: a comparison of results of the Mustard procedure versus the arterial switch*, Ann. Thorac. Surg., 48:10 (1989). When such an "arterial switch" of the great vessels is performed, the delicate neonatal coronary arteries must also be transferred to the new aorta so that they can obtain oxygenated blood. Serraf, A., et al., *Anatomic correction of transposition of the great arteries in neonates*, J. Am. Coll. Cardiol., 22:193 (1993); Day, R. W., Laks, H., and Drinkwater, D. C., *The influence of coronary anatomy on the arterial switch operation in neonates*, J. Thorac. Cardiovasc. Surg., 104:706 (1992).

Accordingly, it is an object of the present invention to provide an animal model which allows surgeons to obtain operative experience with corrective surgery for TGA and congenitally corrected transposition of the great arteries (corrected TGA).

Another object of the present invention is to provide an animal model with which to develop better corrective operations for patients with TGA and corrected TGA.

Another object of the present invention is to provide an animal model which makes it possible to establish what the earliest reversible and irreversible clinical, echocardiographic, electrocardiographic, hemodynamic, histologic, extracellular, cellular, intracellular, biochemical and other signs of right ventricular (RV) failure are when the RV is used as a systemic pump, such as in patients who have had the older Mustard-type repairs of TGA.

Another object of the present invention is to provide an animal model which allows the determination of the safest way to recruit a patient's pulmonary ventricle to replace the patient's own failing systemic ventricle. This knowledge should lead to earlier, safer, and more frequent conversion of Mustard-type repairs of TGA to an arterial switch repair.

Another object of the present invention is to provide an animal model with which to train surgeons to recruit a patient's own pulmonary RV to replace the patient's failing systemic LV (due to isolated LV infarct, for example) as a substitute for cardiac transplantation in an era when the demand for scarce donor hearts is far greater than the supply of such hearts, and when there is still much toxicity of immunosuppressive medicines, and to provide this operation to selected appropriate cardiac transplant and other candidates.

Another object of the present invention is to provide an animal model of the irregular heart rhythms which occur frequently in humans following the Mustard or Senning atrial switch operation. The animal model described provides an in situ setting in which to develop and test pacemakers and other therapies which are designed to control these sometimes life threatening irregular heart rhythms.

Another object of the present invention is to provide an animal model in which normal morphologic left and right ventricles are interchanged between the pulmonary and systemic circulations. The transfer of the pulmonary ventricle to the systemic position requires myocardial hyperplasia in human infants and hypertrophy in older humans. The availability of and ability to harvest and fully study left and right ventricles at varying stages of hyperplasia and/or hypertrophy will allow the use of available standard techniques to identify, produce, purify, and test the therapeutic value of regulators which play a role in the hyperplasia, hypertrophy, and other responses which occur when infant and older ventricles are switched from the pulmonary to the systemic circulation.

Another object of the present invention is to provide an animal model with which to determine the reasons(s) that aortic valve incompetence occurs early in about 40% of babies who have an arterial switch as a first operation for TGA at Boston Children's Hospital. See Jenkins, K. J., et al., *Function of the anamotic pulmonary valve in the systemic circulation*, Circulation 84[5 Suppl. III]:173(1991). For example, the model makes it possible to assess whether which of several possible coronary implant techniques is utilized has an impact on the future development of aortic incompetence.

Another object of the present invention is to provide an animal model with which to determine the reasons(s) that the incidence of aortic valve incompetence early postop rises to 80% when the arterial switch is performed at Boston Children's Hospital to replace a patient's failing systemic RV with their own pulmonary LV many years after a Mustard-type repair of TGA. See Chang, A. C., et al., *Surgical management of late right ventricular failure after Mustard or Senning repair.* Circulation, 86[Supp. 11]:140 (1992).

Another object of the present invention is to provide an animal model with which to establish the safest way to implant the largest replacement aortic valve possible following the arterial switch operation, and to use the model to train surgeons how to perform such valve replacements, since the advantage of replacing a patient's failing systemic ventricle with their own pulmonary ventricle, using an arterial switch, far outweighs the disadvantage of potential aortic valve replacement which is associated with the arterial switch operation.

The previously well described atrial level and arterial level switch operations, which are well known to surgeons versed in the art of pediatric cardiothoracic surgery, each require pre-existing transposition physiology in order to result in "correct" postoperative physiology and survival. A novel aspect of this disclosure is that both atrial and arterial level switch operations are performed in the same normal animal, resulting in a surviving animal whose left ventricle pumps deoxygenated blood to the lungs and whose right ventricle pumps oxygenated blood to the body, the reverse of the usual situation (see FIGS. 1 and 2). Such unusual circulatory connections are present in humans who have the condition called congenitally corrected transposition of the great arteries (corrected TGA). The actual anatomy of the described animal model is not, however, identical to the human condition of corrected TGA. For example, although deoxygenated blood does flow from the right atrium to the left ventricle in the animal model, similar to the actual human condition of corrected TGA, the actual right atrial chamber is not directly connected to the left ventricular chamber in the animal model. Instead, deoxygenated blood is diverted to the left ventricle through a tunnel created by an atrial switch operation. In the described animal model, the left atrial chamber is not directly connected to the right ventricular chamber, as it is in human corrected TGA, and in the model oxygenated blood flows from the lungs to a chamber which is composed of both left and right atrial tissue, and from which the only exit route is via the tricuspid valve, and into the right ventricle. The conduction tissue which carries electrical signals to the heart muscle is in an abnormal position in human corrected TGA and this is not duplicated in the described animal model. Other anatomic differences exist between the animal model and human corrected TGA. Thus the described animal model is similar to human corrected TGA because of the sequence of cardiac chambers and great vessels through which blood flows in the animal model compared with the actual human condition.

SUMMARY OF THE INVENTION

This invention provides an animal model of some of the circulatory connections found in the human condition of congenitally corrected transposition of the great arteries and methods for creating the same by producing fatal transposition of the great arteries physiology within the heart and repairing it outside the heart at the level of the pulmonary artery and the aorta. The methods comprise steps of altering a normal animal heart such that deoxygenated blood from the animal body is routed to the left ventricle instead of the right ventricle and altering the normal vasculature of the animal body such that the left ventricle then pumps the deoxygenated blood to the lungs of the animal, and the right ventricle pumps the oxygenated blood to the body.

DETAILED DESCRIPTION OF THE INVENTION

Overview of a Double Switch Operation in the Normal Animal Heart (Atrial Plus Arterial Level Switch)

Figure 1:
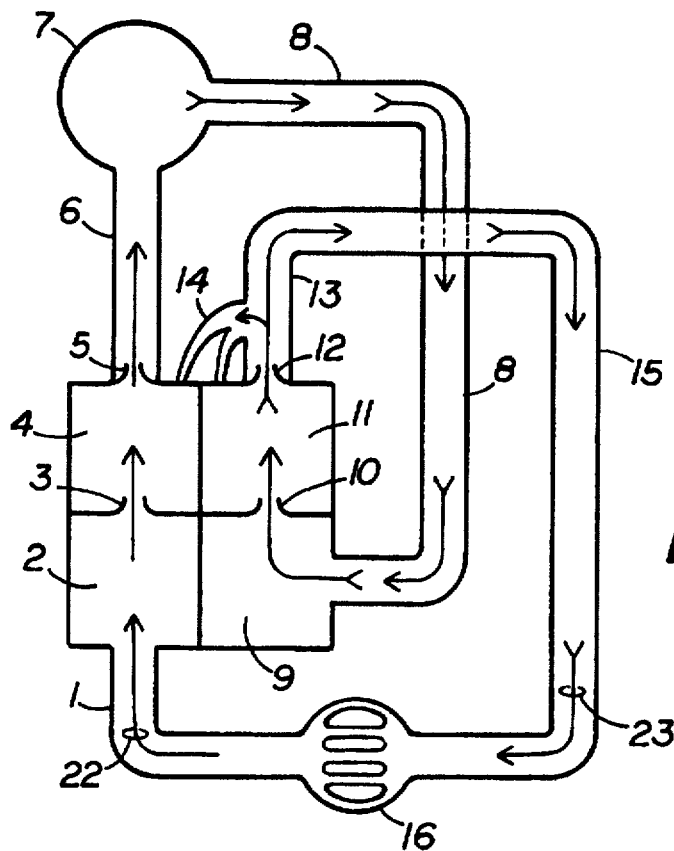
FIG. 1 shows deoxygenated and oxygenated blood flowing through the circulatory connections of a highly simplified schematic diagram of a normal human and animal heart and circulation.

Although any normal animal circulatory system could be altered as described below to create a model of corrected transposition of the great arteries, the pig is presently the preferred animal for the model. A heart-lung machine, or other support system (e.g., "cross-circulation" by a support pig), and cardioplegia (a potassium containing solution designed to stop the heart and protect it during the operation) are used to make it possible to conduct an atrial switch in a normal neonatal piglet (less than about 2 weeks old, or an older pig in which the right ventricle has been "prepared" by a period of banding of the main pulmonary artery). The atrial switch can be of the Mustard, Senning, or other variety. Such atrial switch procedures are well known to surgeons versed in the art of pediatric cardiothoracic surgery. Any operative technique can be utilized so long as it results in the blue (deoxygenated) blood (22) (in FIG. 1 arrow without tail:→) which is returning to the heart from the body via the superior vena cava (1) (single vessel depicted in FIG. 1 represents combined blood return of both superior and inferior vena cavae) and inferior vena cava (1) being directed through the mitral valve (10) into the left ventricle (11), and the red (oxygenated) blood (23) (in FIG. 1 arrow with tail: →) which is returning to the heart from the lungs (7) (left and right lungs not individually depicted in FIG. 1) via the pulmonary veins (8) (only one of four pulmonary veins depicted) being directed through the tricuspid valve (3) into the right ventricle (4). One example of this kind of operation is described below.

The arterial switch operation is performed next, but it would also be possible to perform the arterial switch prior to the atrial switch operation, so long as both steps are done before coming off of the heart-lung machine. Such arterial switch procedures are well known to surgeons versed in the art of pediatric cardiothoracic surgery. One example of the arterial switch operation in this model is described below, but it is possible to perform this in several ways, so long as red blood from the right ventricle (4) is ultimately directed out to the body (16) and coronary arteries (14, 24) (only one of two main coronary arteries depicted) via the new aorta (21), and blue blood (22) from the left ventricle (11) is directed to the lungs (7) via the new main pulmonary artery (19)(only main, and not left and right, pulmonary artery depicted).

By performing an atrial switch and then an arterial switch (double switch) in the same normal heart, one creates a model in which blue blood flows to the "incorrect" ventricle (LV (11)), then becomes oxygenated in the lungs (7), returns to the "incorrect" ventricle (RV (4)), and is then ejected by this ventricle out the aorta to the body and the coronary arteries. The surgically created "mistake" at the atrial level is corrected by a second "mistake" at the level where the blood leaves the heart. This then creates a surviving, normally oxygenated animal in which the morphologic left ventricle (11) pumps to the lungs (7) and the morphologic right ventricle (4) pumps to the body (16), the reverse of the usual situation.

EXAMPLES

Materials and Methods:

Step 1: Forcing the Blue Blood Which is Returning to the Heart from the Body to Go to the Left Ventricle Instead of the Right Ventricle The following is one technique by which blue (deoxygenated) blood (22) can be routed to the left ventricle (11) (instead of the normal right ventricle). The right sided receiving chamber (right atrium) (2) is opened obliquely and the dividing wall between the right and left receiving chambers is cut away. A piece of the sac that is normally around the outside of the heart (pericardium) or other material is cut into a rectangular shape with both long ends of the rectangle cut so that they curve somewhat toward the center of the rectangle at their mid-portion and then back out again.

Figure 2:
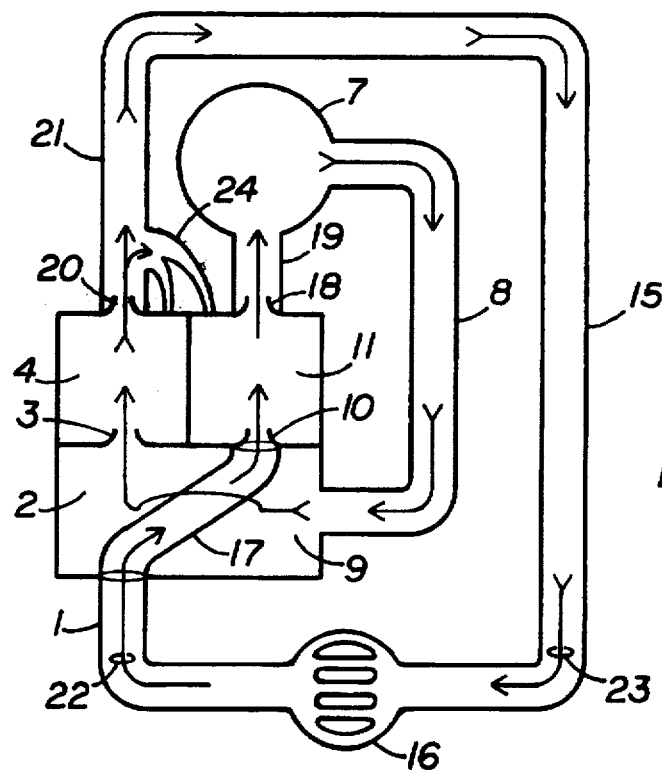
FIG. 2 shows deoxygenated and oxygenated blood flowing through the circulatory connections after a combined atrial switch and arterial switch (double switch operation) of the highly simplified schematic diagram of the normal heart and circulation from FIG. 1.

Using very thin suture material, approximately 7-0, the mid-portion of one of the long sides of the rectangle is stitched just below the 6 o'clock position of the valved opening that leads to the left ventricle (11). The stitch is well above the openings for the blood vessels (pulmonary veins (8)) that normally bring blood back from the lungs (7) to the left atrium (9). The stitching is continued so that each half of the attached long side of the rectangle is further attached to the remaining receiving chamber tissue in a line that keeps it outside of a theoretical rectangle which could be formed by drawing lines between the two veins which normally return red blood to the left sided receiving chamber from the left lung and the two veins which normally return red blood to the left sided receiving chamber from the right lung, respectively. The stitching continues so that the opposite short ends of the rectangle become sewn around the openings of the upper and lower blood vessels which bring blue blood (22) from the body (16) back to the right sided receiving chamber of the heart (i.e., the superior vena cava (1) for the blue blood from the upper part of the body and the inferior vena cava (1) for the blue blood from the lower part of the body—the single vessel (1) returning deoxygenated blood to the heart in FIGS. 1 and 2 is meant to schematically represent the combined blood return of both the superior and inferior vena cavae). The remaining long end of the rectangle of pericardium or other material is then sewn to the edge of wall that remains from where the wall between the right and left sided receiving chambers was cut away, and which divides the valved opening to the right ventricle (tricuspid valve(3)) above, from the valved opening to the left ventricle (mitral valve (10)), below. This attaches the second long edge of the rectangle along the 6 o'clock position of the valve opening that leads to the pumping chamber that normally pumps blood to the lungs (RV (4)).

The rectangular patch of sac tissue or other material therefore creates a tunnel pathway (17) which forces blue blood from both the upper body and the lower body to go through the valve (10) which leads to the pumping chamber for the body (LV (11)), and which does not obstruct the four openings through which red blood returns to the left sided receiving chamber (9) from the lungs (7). The incision in the right sided receiving chamber (2) is then stitched closed. This allows red blood (23) from the lungs to flow around the outside of the new tunnel pathway (17) that has been created and up to the valve (3) which leads to the pumping chamber that goes to the lungs (RV (4)). Thus, blue blood (22) returning to the heart from the body is now forced to go to the pumping chamber that pumps blood back to the body (16), and red blood (23) returning to the heart from the lungs is now forced to go through the tricuspid valve (3) and into the pumping chamber which pumps blood back to the lungs.

One way to think about the new pathway is that the right (2) and left (9) receiving chambers (atria) are turned into a single large chamber by taking away the dividing wall that normally partitions the two receiving chambers. Thus, both blue blood (22) from the body and red blood (23) from the lungs flows into a common receiving chamber. Then the two openings into the receiving chamber through which blue blood returns from the upper body and the lower body, respectively, are connected to each other by a tube (17) (which is made out of the sac that is normally around the outside of the heart, or other material). A large opening in one side of the mid-portion of this tube is sewn around the valved opening (mitral valve (10)) which leads to the pumping chamber that normally pumps to the body (LV (11)). Because the tube blocks the entry to the mitral valve (10) for all except the blue blood (22) which is flowing enclosed within the tube (17), the red blood (23) which comes back to the left atrium (9) of the heart from the lungs (7) is now forced to flow outside the tube and then through the valved opening (tricuspid valve (3)) which leads to the pumping chamber that normally pumps to the lungs (RV (4)).

Blue blood (22) from the body is therefore sent back to the body without ever being allowed to go to the lungs and become red, and red blood (23) from the lungs is futilely returned back to the lungs without being depleted of oxygen or supplied in any way to the rest of the body. Thus far, therefore, the model reproduces the abnormal physiology (but not the abnormal anatomy) that exists with the blue (22) and red blood (23) when a baby is born with the disease transposition of the great arteries (which is almost always fatal if not treated).

Step 2: Forcing the Red Blood to Go Out to the Body (Systemic Circulation) Instead of Allowing it to Return Back to the Lungs The large blood vessel (main pulmonary artery (6)—only main, and not left and right, pulmonary artery depicted) which comes from the right sided pumping chamber (RV (4)) and goes to the lungs (7) and the large blood vessel which comes from the left sided pumping chamber (LV (11)) and goes to the body (aorta (13)) are separated from each other for several centimeters and the blood vessel which connects them in utero (ductus arteriosis) is tied off at both ends and cut in half, if present. In older animals, the ductus arteriosis will likely be occluded or have become the fibrous strand known as the ligamentum arteriosus, and is divided in the same way if present. The branches of the pulmonary artery (6) which go to the left and right lung (7), respectively, are cut away from all attached tissue up to the point where they begin to branch again within the left and right lung, respectively. The main pulmonary artery (6) is cut in half at a point before it branches to the left and right lung (7), respectively. (The distal part of the single vessel (6, 19) carrying blood to the lungs in FIGS. 1 and 2 is meant to schematically represent the combined blood flow of both the left and right pulmonary arteries beyond the main pulmonary artery.) The aorta (13) is also cut in half at about the same distance from the heart.

The two tiny and delicate blood vessels (coronary arteries (14)) which carry red blood (23) from the aorta (13) down into the heart muscle each come from small openings in the aorta (13) close to the heart. (The single coronary artery (14, 24) (only one of two main coronary arteries depicted) coming from the aorta in FIGS. 1 and 2 is meant to schematically represent the combined blood flow of both the right and left main coronary arteries.) Starting at the cut, open edge of the portion of the old aorta (13) which is still attached to the heart, a somewhat rectangular strip of aortic wall which includes the tiny opening of the blood vessel which brings red blood (23) to the right sided heart muscle is cut out and removed from the aorta (13) without damaging the delicate attached coronary artery (14) or its open end in the patch of old aortic wall, or the underlying delicate previous aortic valve (12) or its support structure. A second similar somewhat rectangular piece of aortic wall which contains the tiny opening for the blood vessel which brings red blood (23) to the left sided heart muscle is cut out and removed from the aorta without damaging the delicate attached left main coronary artery or its open end in the patch of old aortic wall, or the underlying delicate previous aortic valve (12) or its support structure. The segments of coronary artery (14) attached to each cut out section of old aortic wall are then gently freed (for a millimeter or two, starting with their open end) from any tethering tissue which prevents the undistorted transfer of the coronary arteries to their new position, without damaging the delicate coronary arteries (14) themselves.

The pieces of aortic wall that have been removed from the portion of old aorta (13) that is still attached to the heart leave two large holes in this part of the old aorta and these two holes are patched up with pieces of the sac that was around the outside of the heart (pericardium) or other material. As described by others, the open end of this part of the old (and now patched) aorta is then attached with fine stitches to an opening which is made in the right branch of the pulmonary artery at the location which is most adjacent to the natural position of the old ascending aorta (13). See Tam, S., et al., *Transposition of the great arteries with posterior aorta*, J. Thorac Cardiovasc Surg 100:441–444 (1990); Ebels, T., *Coronary compression after arterial switch procedure*, J. Thorac Cardiovasc Surg, p. 632 (February 1994); Wernovsky, G. et at., *Factors influencing early and late outcome of the arterial switch operation for transposition of the great arteries*, J. Thorac. Cardiovasc Surg. 109:289–302 (1995). The remaining open end of the main pulmonary artery (6) which is still attached to the left and right pulmonary arteries, is stitched closed. This attachment of old "proximal aorta" (which is the segment of aorta which remains attached to the heart) to the right pulmonary artery creates a "new pulmonary artery" (19) which allows blood to travel from the LV(11), through the previous aortic valve (12) (now the new pulmonary valve (18)), to both the right and left lungs (7).

The patch of aortic wall which is attached to each of the two coronary arteries (14) is rotated up toward the portion of old main pulmonary artery (6) which is still attached to the heart, and sites are selected to sew these patches to the old main pulmonary artery wall. Site selection is critical since the coronary arteries (14) must not kink in their new position, so that red blood (23) can still flow easily through the coronary arteries (14) to the heart muscle. Once these coronary implant sites are selected, a longitudinal cut is made starting at the open free edge of the old main pulmonary artery (6) and this longitudinal cut is continued down to the selected implant site for the left coronary artery (14) in the old main pulmonary artery wall. Any coronary transfer technique that works for the surgeon can be used. Others have described, and we find quite helpful, continuing the longitudinal incision in the vessel wall for a few millimeters at a right angle to itself once the incision reaches a level which is slightly closer to the heart than the desired coronary implant site in the new aorta. This "hinged trapdoor" (or "hockey stick") incision creates a "flap" of vessel wall which greatly facilitates a nonobstructive coronary transfer. See Brawn, W. J., et al., *Early results for anatomic correction of transposition of the great arteries and for doubleoutlet right ventricle with subpulmonary ventricular septal defect*, J. Thorac Cardiovasc. Surg. 95:230–238 (1988).

The patch of aortic wall is sewn into this slit using extremely fine stitches, taking care not to rotate the coronary artery (24) and thereby creating a twist which blocks the flow of red blood to the heart muscle and taking care not to injure the underlying delicate previous pulmonary valve (5), which is about to become the new aortic valve (20). A second cut is made in a similar fashion down to the previously selected right coronary artery (14) implant site, and the right coronary patch is then implanted in this slit in the same way that the left coronary patch was inserted.

Once both coronary arteries (24) are connected to the old main pulmonary artery (6), the open end of this old main pulmonary artery is then attached to the open end of the portion of the old aorta (13) which is still attached to the body. With these new connections, the blue blood (22) which has artificially returned to the left sided pumping chamber (11) from the body (16) is now directed out to the lungs (7) via the new main pulmonary artery (19). The red blood (23) which has artificially returned to the right sided pumping chamber (4) from the lungs (7) is now detected from the RV (4), out through the previous pulmonary valve (5) (now the new aortic valve (20)), into the new aorta (21) and out to the body (16), in part via the descending aorta (15), and also via the new aorta (21) to the translocated coronary arteries (24) which supply the heart muscle with red blood.

The surgeon performing the above methods obtains experience with corrective surgery for TGA, corrected TGA, and related conditions.

The arterial switch can also be achieved by the method (or a modification of the method) of Aubert, see Aubert, J., et al., *Transposition of the great arteries. New technique for anatomical correction*, Br. Heart J. 40:204 (1978), by cutting the aorta (13) and pulmonary artery (6) in half, as above, and then connecting them to each other by making a hole in the wall of the old aorta and a hole in the wall of the old main pulmonary artery at sites just below the cut edges of these two large blood vessels, respectively (making the two holes immediately adjacent to each other). Fine stitches are then used to attach the two holes to each other so that blood can flow between the old proximal aorta and the old proximal main pulmonary artery (creating an "AP window"). Blood is directed from this connecting hole down to the two normal coronary artery openings in the old aorta (13) via a tunnel pathway formed by stitching an upside down "Y-shaped" piece of pericardium (or other material) to the inside wall of the old aorta (13). The piece of pericardium (or other material used to create the roof of this intravascular tunnel can also be triangular or other shapes.

The opening in the old pulmonary artery (6) which still leads to the lungs (7) is extended into the beginning of the right pulmonary artery, so that the open end of the portion of the old aorta (13) which is still attached to the heart can be connected with fine stitches to the right branch of the pulmonary artery at the location which is most adjacent to the natural position of the old ascending aorta (13). The remaining open portion of the main pulmonary artery (6) which is still attached to the left and right pulmonary arteries is then stitched closed. The open end of the segment of old main pulmonary artery (6) which is attached to the heart is then stitched to the open end of the portion of aorta (13) which is attached to the body (16). Thus, red blood flows to the body through the new aorta (21), as above, but is directed to the coronary arteries (14) by passing through the new hole between the new aorta (21) and the new main pulmonary artery (19) ("AP window") and down the new tunnel pathway which runs inside the new main pulmonary artery (19) and which leads to the openings to the two coronary arteries (14). Using this technique the coronary arteries (14) themselves do not have to be moved to a new, and possibly distorting, position.

The above methods lend themselves well to the design and evaluation of better operations for TGA, and corrected TGA, and related conditions.

The present invention makes it possible to establish what the earliest reversible and irreversible clinical, echocardiographic, electrocardiographic, hemodynamic, histologic, extracellular, cellular, intracellular, biochemical and other signs of right ventricular (RV) failure are when the RV is used as a systemic pump, such as in patients who have had the older Mustard-type repairs of TGA.

Step 3: Banding the Main Pulmonary Artery to Make Possible the Future "Retraining" of the "Deconditioned" Pulmonary Ventricle The principles and techniques of pulmonary artery banding are well known to surgeons versed in the art of pediatric cardiothoracic surgery. Any pulmonary artery banding technique can be used. An "adjustable" type of band can be placed loosely around the pulmonary artery at any time prior to when the effect of the tight band is desired. Alternatively, a non-adjustable band can be initially placed tightly around the pulmonary artery at any time that such a tight banding effect is desired. Choosing the "adjustable" option eliminates the necessity of dissecting the previously operated pulmonary artery out from scar tissue at the time that a tight band is desired, since a loose band can be left around the new pulmonary artery (19) at the time of the initial double switch operation. Any adjustable or non-adjustable technique that increases the pressure in the proximal pulmonary artery at the time that such elevated pressure is desired can be used. Clinical use of the adjustable technique described below was first reported in 1983. See Muraoka, R. et al., *Extrathoracically adjustable pulmonary artery banding*, J. Thorac. Cardiovasc. Surg., 86:582 (1983).

A 3 millimeter in diameter microporous expanded polytetrafluoroethylene (PTFE) or other vascular tube graft is cut at both ends at a 45 degree angle to a total length that is 2 millimeters longer than one half of the estimated circumference to which the pulmonary artery is projected to grow by the time that tight banding is planned. (The 45 degree angle cuts at either end are mirror images of each other and the graft is measured from the farthest tip of one end to the farthest tip of the other end.) A piece of 5 millimeter in diameter PTFE or other graft is also cut to the same length and in the same way as the 3 millimeter graft, including angled ends, and a small hole is cut in the midpoint of the shortest side of the 5 millimeter tube. A long "number 2" nylon ligature (or other material) is passed through the 3 millimeter graft and the graft/ligature unit is then passed around the main pulmonary artery. One end of the nylon ligature now encircling the pulmonary artery is inserted into one end of the 5 millimeter graft and then brought out through the hole at its midpoint, and then through one of the central holes in a small sterile button or other buttressing material which is larger than the hole in the midpoint of the 5 millimeter graft. The other end of the heavy nylon ligature is inserted into the other end of the 5 millimeter graft and is then brought out through the midpoint hole in the graft and then through a different hole in the small button. Both ends of nylon ligature are then passed through a narrow, somewhat flexible, plastic tube and the tourniquet is tightened until 2 millimeters of the most distal tip of both ends of the 3 millimeter graft is drawn within the respective adjacent lumens of the 5 millimeter graft (with both distal tips of both the 3 and the 5 millimeter grafts oriented to the innermost circumference of the encircling PTFE tube that is formed, so that the encircling nylon suture does not anywhere come in direct contact with the underlying blood vessel wall). Multiple titanium or other clips (larger than the diameter of the plastic tube) are placed tightly on the end of the tube and the ligature itself where the two nylon ends emerge most distal to the pulmonary artery, to prevent the nylon ends from retracting back into the tube. The loosely encircling graft material is secured with some superficial stitches to the pulmonary artery at a point between the heart and the bifurcation of the pulmonary artery to the left and right lungs. The clipped end of the tube is placed under the skin so that at some time in the future, a small incision can be made in the skin and the nylon, or other, snare pulled through the tubing to create a constricting (but not cutting) band around the main pulmonary artery. When the snare is tightened in this way the pressure against which the pulmonary ventricle has to pump rises and the muscle in this pumping chamber compensates by growing stronger so that it can continue to pump the same amount of blood despite the higher pressure (see next paragraph). All leaking areas are repaired, the patient is taken off the heart-lung machine (not necessary to use for banding alone, but in this example previously used for double switch operation), and the chest is closed. The pulmonary artery (19) can also be ensnared with other material, or bandied with a band which is variably and reversibly tightened from outside of the body by inflating it with varying amounts of fluid, as described in Higgins, C. B., et al., *Modified technique for production of experimental right sided congenitive heart failure*, Cardiovasc. Res. 7:870(1973), or by other methods, including those of Higashidate, M., et al., *Percutaneously adjustable pulmonary artery band*, J. Thorac Cardiovasc. Surg. 97:864–9 (1989); Dajee, H., et al., *An improved method of pulmonary artery banding*, Ann. Thorac. Surg. 37:254(1984); Park, S. C., et al., *A percutaneously adjustable device for banding of the pulmonary trunk*, International Journal of Cardiology, 9:477–484(1985); and Solis, E., et al., *Percutaneously adjustable pulmonary artery band*, Ann. Thorac. Surg. 41:65 (1986); Aoyagi, T. et al., *Transition from compensated hypertrophy to intrinsic myocardial dysfunction during development of left ventricular pressure-overload hypertrophy in conscious sheep*, Circulation 88[part 1]:2415–2425 (1993); Katayama, H. et al., *Induction of right ventricular hypertrophy with obstructing balloon catheter*, Circulation 88[part I]:1765–1769 (1993).

Subsequent Interchange of the Pulmonary for the Systemic Ventricle

Because the left ventricle (11) is now pumping to the low pressure lungs (7), it does not need to be very strong. If it were suddenly required to pump to the high pressure body (16), it would be too weak to do so, even though it had done so before it was switched to the lung circulation. To "prepare" the pulmonary ventricle to pump to the body (16), a small skin incision is made over the end of the adjustable snare, and the snare is tightened by placing additional metal clips on the two free ends of heavy nylon ligature (or other material) just beyond the plastic tube, thereby drawing small additional amounts of nylon ligature (or other material) up through the tube and tightening the encircling snare around the new main pulmonary artery (19). The skin incision is closed when the snare is determined to be tightened enough by either pressure or echocardiographic or other measurements.

At the time of pulmonary artery band tightening, or at other times, some animals may also have a standard systemic to pulmonary artery shunt placed. Such a "modified Blalock-Taussig shunt" could consist of a 5 millimeter in diameter tube made of a suitable artificial material such as polytetrafluoroethylene (PTFE vascular graft, Gore-tex, registered trademark: W.L. Gore and Associates, Inc., Elkton, Md.) which connects the blood flow from the left subclavian artery to the left pulmonary artery. See de Leval, M. R., et at., *Modified Blalock-Taussig Shunt: use of subclavian artery orifice as flow regulator in prosthetic systemic-pulmonary artery shunts*, J. Thorac Cardiovasc. Surg. 81:112 (1981).

At the time of pulmonary artery band tightening, or at other times, some animals may have an adjustable sized hole between the left atrium and the right atrium either increased or decreased in size to change the amount of mixing that is allowed between the red and the blue blood at the atrial level. The adjustable hole can be created in selected animals at the time the atrial switch operation is being completed. One previously described way to create such a hole is to leave a piece of the pericardium, or other material, that is used to create the lateral portion of the tunnel for the blue blood near the interior vena cava unattached to the lateral right atrial wall for several millimeters. The perimeter of this hole is encircled with a stitch made of heavy nylon, prolene, or other material in a pursestring fashion, and both ends of the pursestring are delivered through the lateral right atrial wall from within the blue blood tunnel (17) a few millimeters from each other, then through an approximately 4 by 4 millimeter square piece of PTFE or other material, and then through a plastic tube. At the other end of the tube, titanium or other clips are placed on the emerging nylon sutures, to keep them from slipping back into the tube, and this end is placed under the skin at the midline, just caudad to the diaphragm, where it can be accessed in the future for snare tightening or loosening. See Laks, H., et al., *Partial Fontan: advantages of an adjustable interatrial communication*, Ann. Thorac. Surg. 52:1084 (1991); Pearl, J. M. and Laks, H., *The Partial Fontan: controlled temporary systemic venous decompression after the fontan procedure*, Sem. Thorac. Cardiov. Surg. 6:21 (1994). A second piece of nylon suture is tied to the end of the nylon pursestring at a point that is farthest from where the pursestring suture enters the plastic tube, and both ends of this second piece of heavy suture are passed within the blue blood tunnel (17), out through the right atrial wall near the insertion of the inferior vena cava (1) and then along the outside of the plastic tube, where they are then secured to the outside of the distal end of the tube with additional titanium or other clips. To open the hole, both ends of this suture attached to the distal end of the pursestring are gently pulled (through a skin incision) while snare nylon is allowed to be pulled in and delivered back to the hole and the pursestring through the plastic tube. A third piece of heavy nylon suture which was attached to the square piece of PTFE or other material (which lies between the end of the plastic tube and the outside right atrial wall) when it was first placed, passed along the outside of the tube, and stored with marking clips just as the second piece, is then gently pulled (via the same skin incision) to more evenly distribute the extra pursestring nylon that is now available to the hole. The size of the hole can be decreased by tightening the snare nylon suture through the tube and securing its tighter position with titanium or other clips against the distal end of the tube.

After a period of days to months of pulmonary artery banding (with or without a systemic to pulmonary artery shunt, and with or without a hole between the left and the right atrium), and when it is judged to be strong enough on the basis of clinical, echocardiographic, hemodynamic, radiologic, histologic, biochemical, or other criteria, the pulmonary ventricle is placed in the systemic circulation by performing the arterial switch procedure previously described above, but in reverse, cutting out the Mustard pericardial tunnel (17) (or "taking down" the Senning atrial switch operation), and recreating the normal wall between the left and right receiving chambers with material such as tissue from the patient (such as remaining pericardium) or suitable artificial material such as polytetrafluoroethylene (PTFE, Gore-Tex, registered trademark: W.L. Gore and Associates, Inc., Elkton, Md.), or dacron cloth.

The surgeon performing the above methods obtains experience with corrective surgery for TGA, corrected TGA, and related conditions.

As mentioned in the Overview section, if the double switch operation is planned in a normal animal that is older than about 2 weeks of age, the pulmonary ventricle must be "prepared" to take over systemic work by first undergoing a period of days to months of pulmonary artery banding during which time the pulmonary ventricle must pump blood through the band at near systemic pressure. See, Ilbawi, M. N., et al., *Preparation of the left ventricle for anatomical correction in patients with simple transposition of the great arteries*, J. Thorac Cardiovasc. Surg. 94:87–94 (1987). When the pulmonary ventricle is judged to be strong enough in the pulmonary position on the basis of clinical, echocardiographic, hemodynamic, radiologic, histologic, biochemical, extracellular, cellular, intracellular or other criteria, the double switch can proceed in the normal non-neonatal heart. The model lends itself well to a comparison of these various noninvasive and invasive criteria for deciding when any type of ventricle in the pulmonary position has been adequately "prepared" to be able to perform systemic work. Determining the safest way to recruit a patient's left ventricle from the pulmonary position to replace the patient's own failing systemic RV (by studying the above criteria in normal animals whose LV has been banded following the described double switch operation) should lead to earlier, safer, and more frequent conversion of Mustard-type repairs of TGA to an arterial switch repair. The model can then be used to train surgeons to perform this type of surgery. Determining the safest way to recruit a patient's right ventricle from the pulmonary position to replace the patient's failing systemic LV (by studying the above criteria in normal animals whose RV is banded prior to the described double switch operation) may lead to a substitute for cardiac transplantation for selected patients (e.g., those with LV failure due to isolated LV infarct) in an era when the demand for scarce donor hearts is far greater than the supply of such hearts, and when there is still much toxicity of immunosuppressive medicines. The model can then be used to train surgeons to perform this type of surgery.

Other Uses of the Model

The model provides an animal system in which morphologic left and right ventricles are interchanged between the pulmonary and systemic circulations. The transfer of the pulmonary ventricle to the systemic position requires myocardial hyperplasia in human infants and hypertrophy in older humans. A particular utility of the described model is that the biology of the cardiac and other changes that occur with these transfers are able to be studied at a depth and frequency not remotely possible in humans. For example, frequent endomyocardial biopsies (which would not be justified in patients) and cardiac autopsy specimens are studied histologically to determine capillary density, the connective tissue/muscle ratio, as well as the presence of hyperplasia versus hypertrophy, collagen, elastin, endomyocardial fibroelastosis and other extracellular, cellular, and intracellular features. Myocardial samples are obtained and stored for later quantitation of specific substances.

The availability of and ability to harvest and fully study left and right ventricles at varying stages of hyperplasia and/or hypertrophy allows the use of available standard techniques to identify, produce, purify, and test the therapeutic value of regulators which play a role in the hyperplasia, hypertrophy, and other responses which occur when infant and older ventricles are switched from the pulmonary to the systemic circulation. Standard chemical digests of homogenized left ventricles or LV biopsies harvested at specific intervals from the pulmonary position are compared with such chemical digests of homogenized left ventricles (11) or LV biopsies harvested at specific intervals from the systemic position. The chemical digests are prepared using standard, well described techniques which are well known to those versed in the arts of biochemistry and molecular biology. Similar digests are made of right ventricles (4) or RV biopsies harvested at specific intervals from the pulmonary and systemic positions, respectively. The analysis of these digests of left and right ventricular intracellular and extracellular content in the pulmonary versus the systemic position is performed using existing standard techniques well known to those versed in the art of molecular biology to identify, produce, purify, and test the therapeutic value of regulators which play a role in the hyperplasia, hypertrophy, and other responses of left. versus right ventricles when they are switched from performing pulmonary to performing systemic work.

Another aspect of the present invention is to provide an animal model of the irregular heart rhythms which occur frequently in humans following the Mustard or Senning atrial switch operation. The animal model described provides a way to study the cause(s) of these irregular rhythms and also provides an in situ setting in which to develop and test pacemakers and other therapies which are designed to control these sometimes life threatening irregular heart rhythms.

Another aspect of the present invention is to provide an animal model with which to determine the reasons(s) that aortic valve incompetence occurs early in about 40% of babies who have an arterial switch as a first operation for TGA at Boston Children's Hospital. See Jenkins, K. J., et al., *Function of the anamotic pulmonary valve in the systemic circulation*, Circulation 84[5 Suppl. 111]:173(1991). For example, the model makes it possible to assess whether which of several possible coronary implant techniques is utilized has an impact on the future development of aortic incompetence.

Another aspect of the present invention is to provide an animal model with which to determine the reasons(s) that the incidence of aortic valve incompetence early postop rises to 80% when the arterial switch is performed at Boston Children's Hospital to replace a patient's failing systemic RV with their own pulmonary LV many years after a Mustard-type repair of TGA. See Chang, A. C., et al., *Surgical management of late right ventricular failure after Mustard or Senning repair*. Circulation, 86[Supp. II]:140 (1992).

Another aspect of the present invention is to provide an animal model with which to evaluate why it is that children who are diagnosed with TGA only after their pulmonary left ventricle has become deconditioned, have an increased incidence of LV dysfunction and aortic valve incompetence after their LV is "strengthened" by pulmonary artery banding and they undergo an arterial switch operation. See Boutin, C. et al., *Rapid two-stage arterial switch operation: evaluation of left ventricular systolic mechanics late after an acute pressure overload stimulus in infancy*, Circulation 90:1294–1303 (1994); Colan, S. D., et al., *Status of the left ventricle after arterial switch operation for transposition of the great arteries*, J. Thorac Cardiovasc. Surg. 109:311–321 (1995). The animal model described should facilitate the development of improvements in the therapeutic approach to such a child whose LV has become deconditioned by the time a late diagnosis of TGA is made.

Another aspect of the present invention is to provide an animal model with which to establish the safest way to implant the largest replacement aortic valve possible following the arterial switch operation, and to use the model to train surgeons how to perform such valve replacements, since the advantage of replacing a patient's failing systemic ventricle with their own pulmonary ventricle, using an arterial switch, far outweighs the disadvantage of potential aortic valve replacement which is associated with the arterial switch operation.

What is claimed is:

1. A non-human animal comprising a previously substantially normal animal circulatory system which has been altered such that: deoxygenated blood returning to the heart from the animal's body is routed into the left ventricle; the left ventricle pumps the deoxygenated blood into the lungs of the animal through altered connections of vasculature; oxygenated blood returning to the heart from the animal's lungs is routed into the right ventricle; and the right ventricle pumps the oxygenated blood to the animal's body through altered connections of vasculature.

2. The animal of claim 1, wherein the animal is selected from the group consisting of non-human primate, ovine, porcine, caprine, bovine, canine and feline.

3. The animal of claim 1, wherein the animal is a porcine.

4. A non-human animal comprising a previously substantially normal animal circulatory system which has been surgically altered such that: deoxygenated blood returning to the heart from the animal's body is routed into the left ventricle; the left ventricle pumps the deoxygenated blood into the lungs of the animal through altered connections of vasculature; oxygenated blood returning to the heart from the animal's lungs is routed into the right ventricle; and the right ventricle pumps the oxygenated blood to the animal's body through altered connections of vasculature.

5. The animal of claim 4, wherein the animal is selected from the group consisting of non-human primate, ovine, porcine, caprine, bovine, canine and feline.

6. The animal of claim 4, wherein the animal is a porcine.

* * * * *